(12) United States Patent
Zaitsu et al.

(10) Patent No.: US 8,780,727 B2
(45) Date of Patent: Jul. 15, 2014

(54) WIRELESS LAN SYSTEM, WIRELESS LAN TERMINAL AND BASE STATION SEARCHING METHOD FOR SUCH SYSTEM AND TERMINAL

(75) Inventors: Makoto Zaitsu, Tokyo (JP); Shinichi Morimoto, Tokyo (JP); Youko Omori, Tokyo (JP)

(73) Assignee: NEC Corporation, Tokyo (JP)

( * ) Notice: Subject to any disclaimer, the term of this patent is extended or adjusted under 35 U.S.C. 154(b) by 861 days.

(21) Appl. No.: 12/281,387

(22) PCT Filed: Jan. 22, 2007

(86) PCT No.: PCT/JP2007/050888
§ 371 (c)(1),
(2), (4) Date: Sep. 2, 2008

(87) PCT Pub. No.: WO2007/102283
PCT Pub. Date: Sep. 13, 2007

(65) Prior Publication Data
US 2009/0116465 A1 May 7, 2009

(30) Foreign Application Priority Data
Mar. 9, 2006 (JP) ................. 2006-064112

(51) Int. Cl.
*H04W 4/00* (2009.01)
(52) U.S. Cl.
USPC ............................ 370/241; 370/328; 370/465
(58) Field of Classification Search
None
See application file for complete search history.

(56) References Cited

U.S. PATENT DOCUMENTS

| 2005/0138178 | A1 | 6/2005 | Astarabadi |
| 2005/0266852 | A1 | 12/2005 | Kitamura |
| 2006/0268756 | A1* | 11/2006 | Wang et al. .................. 370/310 |
| 2007/0115899 | A1* | 5/2007 | Ovadia et al. ................. 370/338 |

FOREIGN PATENT DOCUMENTS

| GB | 2337184 A | 11/1999 |
| JP | 1993091038 A | 4/1993 |
| JP | 2000197093 A | 7/2000 |
| JP | 2000333233 A | 11/2000 |
| JP | 2001145146 A | 5/2001 |
| JP | 2001251657 A | 9/2001 |
| JP | 2003108271 A | 4/2003 |
| WO | 2004021731 A | 3/2004 |

OTHER PUBLICATIONS

International Search Report for PCT/JP2007/050888/ mailed Mar. 27, 2007.
International Preliminary Report on Patentability for PCT/JP2007/050888 issued Sep. 9, 2008.
Extended European search report for 07707151 dated Jul. 19, 2012.

* cited by examiner

*Primary Examiner* — Kevin C Harper
(74) *Attorney, Agent, or Firm* — Sughrue Mion, PLLC

(57) ABSTRACT

In terminal (101-1) for communicating with base station (100-1), threshold values (103-1 to 103-2) for searching a base station that will become to be a switching candidate are updated in accordance with the number of base stations which can communicate with terminal (101-1). In the base station that will become the switching candidate, the intensity or communication quality of a signal transmitted from base station (100-1) has been received by terminal (101-1) is previously set.

6 Claims, 12 Drawing Sheets

Fig. 7

| NUMBER OF DETECTED BASE STATIONS | BASE STATION SEARCH TRIGGER THRESHOLD |
|---|---|
| 0~1 | $\alpha$ |
| 2~3 | $\beta$ |
| 4~5 | $\gamma$ |
| 6~ | $\delta$ |

WIRELESS LAN SYSTEM, WIRELESS LAN TERMINAL AND BASE STATION SEARCHING METHOD FOR SUCH SYSTEM AND TERMINAL

TECHNICAL FIELD

The present invention relates to a wireless LAN system having wireless LAN communication capabilities conforming to the standards of IEEE802.11 series, a wireless LAN terminal, and a base station searching method for such a system and terminal.

BACKGROUND ART

Conventionally, in a wireless LAN system, another base station is searched by a wireless LAN terminal for selection as a switching candidate such that even if the wireless LAN terminal moves and cannot communicate with a base station with which it is currently communicating, it can continuously communicate with the other base station. This search method continuously observes the signal intensity or the communication quality of a signal transmitted from the base station with which the wireless LAN terminal is currently communicating and which is received at the wireless LAN terminal. Then, when the observed signal intensity or communication quality falls below a previously set base station search start trigger threshold, the wireless LAN terminal searches for another base station which is selected as a switching candidate.

Also, a method has been contemplated to change the aforementioned base station search start trigger threshold in accordance with the reception level at a terminal of a radio wave transmitted from another base station which is to become a switching candidate (see, for example, JP-2001-145146-A).

Also, a method has been contemplated to set a long scan interval for searching another base station which is to be a switching candidate if there are no other base stations exist from which a switching candidate can be selected (see, for example, JP-2003-108271-A).

However, in the method which uses a previously set base station search start trigger threshold, since the base station search start trigger threshold is single, a futile search can be made depending on the base station installation situation around the location at which a wireless LAN terminal exists. For example, even though no other base stations are installed in surroundings, another base station may be searched in some cases for use as a switching candidate only under the condition in which the signal intensity and the communication quality of a signal, transmitted from a base station with which communication is currently in progress and which is received at the wireless LAN terminal fall below the previously set base station search start trigger threshold. This gives rise to a problem in which power, which is often battery driven, is wasted when used in a wireless LAN terminal.

FIG. 1 is a diagram showing an example in which a wireless LAN terminal moves to a position at which a base station search start trigger threshold is exceeded in a conventional wireless LAN system.

In the conventional wireless system shown in FIG. 1, assume that base stations 900-1-900-2 cover communication areas 902-1, 902-2, respectively, and terminals 901-1-901-2) which are wireless LAN terminals, are communicating with base station 900-1. Assume also that a base station search start trigger threshold for terminals 901-1-901-2 to search another base station is threshold 903 in area 902-1. Assume also that terminal 901-1 exists at position (r), while terminal 901-2 exists at position (t). In this event, since terminals 901-1, 901-2 are positioned within threshold 903, terminals 901-1-901-2 do not search another base station. Here, threshold 903 schematically represents a threshold for the signal intensity and communication quality of a signal transmitted from a base station and received at the wireless LAN terminals.

Subsequently, assume that terminal 901-1 has moved from position (r) to position (s), while terminal 901-2 has moved from position (t) to position (u). As a result, since terminals 901-1-901-2 have gone out of threshold 903, terminals 901-1-901-2 search another base station. With respect to terminal 901-2, since it exists within area 902-2 covered by base station 900-2, base station 900-2 is detected as a switching candidate. On the other hand, with respect to terminal 901-1, since it does not exist within an area covered by another base station, any base station is not detected. Since another base station is subsequently searched at regular intervals as well, a problem arises in that the terminal performs the search processing even though it exists at a location at which any base station cannot be searched, causing useless power consumption.

On the other hand, in the method described in JP-2001-145146-A, when a terminal exists at a position at which a radio wave, transmitted from another base station which is to be a switching candidate, does not reach, i.e., at position (s) shown in FIG. 1, the terminal searches a base station at the same frequency, causing a problem in which power is wasted, as is the case with the aforementioned problem.

Also, in the method described in JP-2003-108271-A which simply adjusts the scan time for the search, processing for searching a base station is performed even when a terminal exists at a position at which a radio wave, transmitted from another base station which is to be a switching candidate, does not reach, i.e., at position (s) shown in FIG. 1, causing a problem that power is wasted, as is the case with the aforementioned problem.

DISCLOSURE OF THE INVENTION

To solve the problems as mentioned above, it is an object of the present invention to provide a wireless LAN system, a wireless LAN terminal, and a base station search method in such a system and terminal which are capable of reducing wasteful power consumption in the wireless LAN terminal.

To achieve the above object, in a wireless LAN system comprising a wireless LAN base station, and a wireless LAN terminal for communicating with the wireless LAN base station and searching a wireless LAN base station which is to be a switching candidate when the intensity or communication quality of a signal transmitted from the wireless LAN base station and received at the wireless LAN terminal falls below a previously set threshold, the present invention is characterized in that:

the wireless LAN terminal changes the threshold in accordance with the number of wireless LAN base stations with which the wireless LAN terminal can communicate.

Also, in a wireless LAN system comprising a wireless LAN base station, and a wireless LAN terminal for communicating with the wireless LAN base station and searching a wireless LAN base station which is to become a switching candidate when the intensity or communication quality of a signal transmitted from the wireless LAN base station and received at the wireless LAN terminal falls below a previously set threshold, the present invention is characterized in that:

the wireless LAN terminal changes the threshold in accordance with the changing amount of the signal intensity or the communication quality.

Also, in a wireless LAN terminal for communicating with a wireless LAN base station and searching a wireless LAN base station which is to become a switching candidate when the intensity or communication quality of a signal transmitted from the wireless LAN base station and received at the wireless LAN terminal falls below a previously set threshold, the threshold is changed in accordance with the number of wireless LAN base stations with which the wireless LAN terminal can communicate.

Also, in a wireless LAN terminal for communicating with a wireless LAN base station and searching a wireless LAN base station which is to become a switching candidate when the intensity or communication quality of a signal transmitted from the wireless LAN base station and received at the wireless LAN terminal falls below a previously set threshold, the threshold is changed in accordance with the changing amount of the signal intensity or the communication quality.

Also, in a wireless LAN terminal for communicating with a wireless LAN base station, a base station search method for searching a wireless LAN base station which is to be a switching candidate when the intensity or communication quality of a signal transmitted from the wireless LAN base station and received at the wireless LAN terminal falls below a previously set threshold, comprises the process operation of:

changing the threshold in accordance with the number of wireless LAN base stations with which the wireless LAN terminal can communicate.

Also, in a wireless LAN terminal for communicating with a wireless LAN base station, a base station search method for searching a wireless LAN base station which is to be a switching candidate when the intensity or communication quality of a signal transmitted from the wireless LAN base station and received at the wireless LAN terminal falls below a previously set threshold, comprises the process operation of:

changing the threshold in accordance with the changing amount of the signal intensity or the communication quality.

In the present invention configured as described above, the wireless LAN terminal for communicating with the wireless LAN base station changes the threshold for searching a wireless LAN base station which is to become a switching candidate, in which the threshold for the intensity or communication quality of a signal transmitted from the wireless LAN base station and received at the wireless LAN terminal has been previously set, in accordance with the number of wireless LAN base stations with which the wireless LAN terminal can communicate.

In this way, the wireless LAN terminal will not uselessly search a wireless LAN base station which is to become a switching candidate when there exists no other communicable wireless LAN base stations making it possible to reduce power consumption for searching a wireless LAN base station. It is also possible to reduce a degradation in the quality of communication operations that results from a useless search operation for a wireless LAN base station.

As described above, in the present invention, useless power consumption can be reduced in a wireless LAN terminal since the wireless LAN terminal for communicating with a wireless LAN base station is configured to change the threshold for searching a wireless LAN base station which is to become a switching candidate, in which the threshold for the intensity or communication quality of a signal transmitted from the wireless LAN base station and received at the wireless LAN terminal has been previously set, in accordance with the number of wireless LAN base stations with which the wireless LAN terminal can communicate.

BRIEF DESCRIPTION OF THE DRAWINGS

FIG. 7
A diagram showing an exemplary correspondence of the number of detected base stations to the base station search trigger threshold shown at (B) of FIG. 6.

BEST MODE FOR CARRYING OUT THE INVENTION

In the following, embodiments of the present invention will be described with reference to the drawings.

Figure 1:
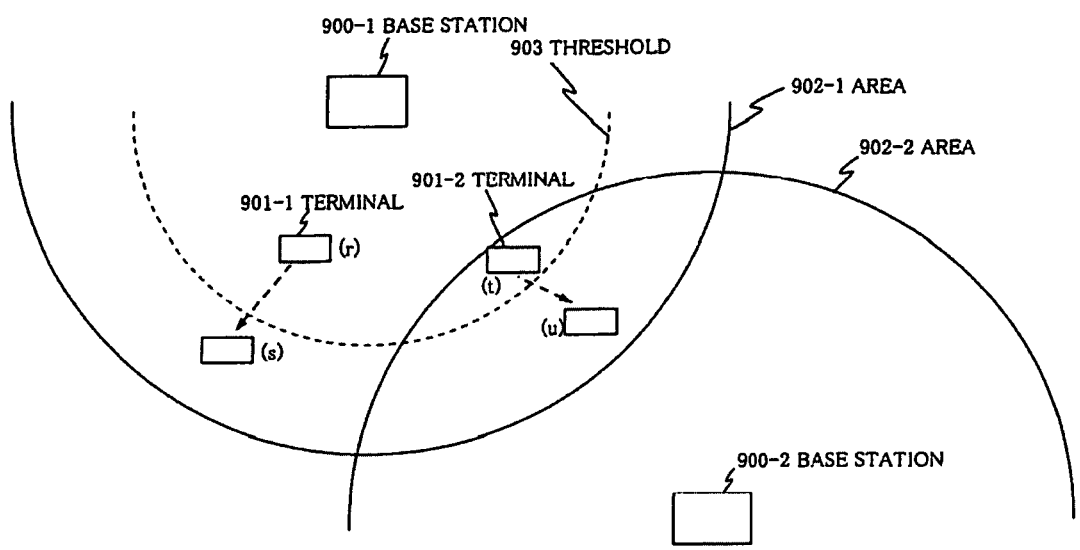
FIG. 1
A diagram showing an example in which a wireless LAN terminal moves to a position at which a base station search start trigger threshold is exceeded in a conventional wireless LAN system.
Figure 2:
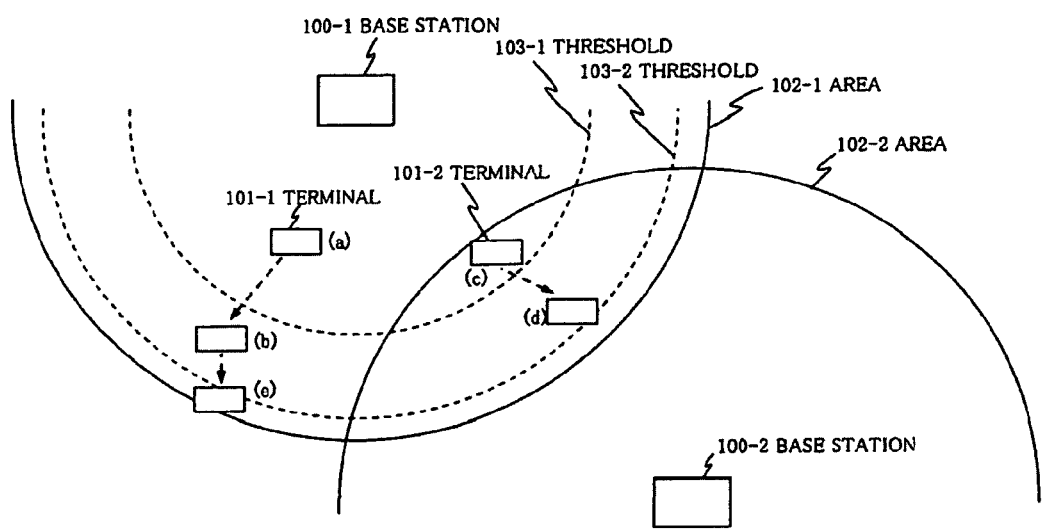
FIG. 2
A diagram showing one embodiment of a wireless LAN system of the present invention.

FIG. 2 is a diagram showing one embodiment of a wireless LAN system of the present invention.

As shown in FIG. 2, this embodiment comprises base stations 100-1-100-2 which are wireless LAN base stations, and terminals 101-1-101-2 which are wireless LAN terminals. Also, communication areas covered by base stations 100-1-100-2 are areas 102-1-102-2, respectively. Assume herein that terminals 101-1-101-2 are communicating with base station 100-1. Also, base stations 100-1-100-2 have unique identification numbers for identifying each of them. Also) assume that a first base station search start trigger threshold for terminals 101-1-101-2 to search another base station in area 102-1 is threshold 103-1, and a second base station search start trigger threshold is threshold 103-2. These thresholds 103-1-103-2 schematically represent the first base station search start trigger threshold and second base station search start trigger threshold based on signal intensities or communication qualities of signals transmitted from base station 100-1 and received at terminals 101-1-101-2. When the signal intensity or communication quality of a signal received at terminal 101-1-101-2 falls below the first or second base station search start trigger threshold i.e., when terminal 101-1-101-2 goes out of threshold 103-1-103-2 in FIG. 2, terminal 101-1-101-2 starts a search for another base station which is to become a switching candidate. Assume also that terminal 101-1 exists at position (a), while terminal 101-2 exists at position (c). Assume that terminal 101-1 subsequently moves from position (a) to position (b), and further subsequently from position (b) to position (e). Assume also that terminal 101-2 moves from position (c) to position (d).

Figure 3:
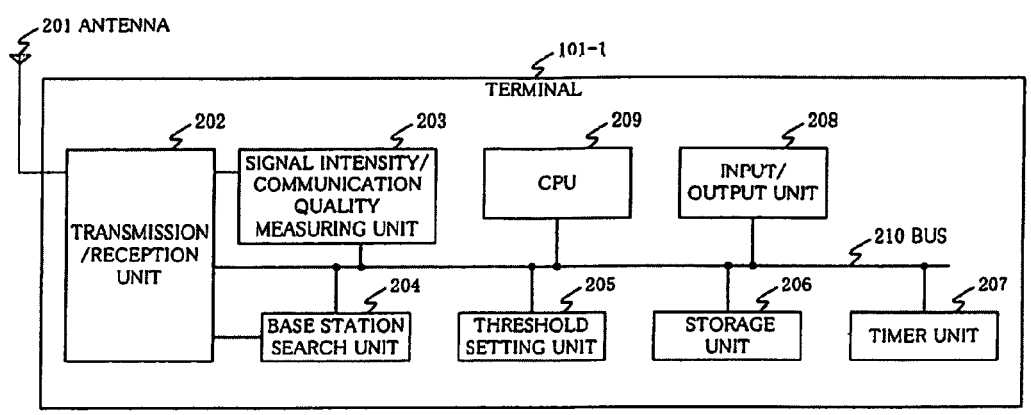
FIG. 3
A diagram showing an exemplary configuration of a terminal in the wireless LAN system shown in FIG. 2.

FIG. 3 is a diagram showing an exemplary configuration of terminal 101-1 in the wireless LAN system shown in FIG. 2.

As shown in FIG. 3, terminal 101-1 shown in FIG. 2 comprises antenna 201, transmission/reception unit 202, signals intensity/communication quality measuring unit 203, base station search unit 204, threshold setting unit 205, storage unit 206, timer unit 207, input/output unit 208, CPU 209, and bus 210.

Antenna 201 transmits and receives radio waves to and from base stations 100-1-100-2. Transmission/reception unit 202 receives a signal transmitted from base station 100-1-100-2 through antenna 201, and transmits a signal to base station 100-1-100-2. Signal intensity/communication quality measuring unit 203 measures the intensity of a signal transmitted from base station 100-1-100-2 and received at transmission/reception unit 202, and measures the signal reception condition, i.e., the communication quality. Base station search unit 204 searches base station 100-1-100-2 with which terminal 101-1 can communicate. Threshold setting unit 205 sets a threshold at which base station search unit 204 starts a search for base station 100-1-100-2. Storage unit 206 comprises ROM for storing a variety of control programs executed by CPU 209, and fixed data such as data for transmission/reception adjustments, network addresses and the like, and RAM for storing data temporarily required for CPU 209 to execute a program, and the program itself, and also stores the threshold set by threshold setting unit 205. Timer unit 207 is a base station search start timer for measuring the timing at which terminal 101-1 starts a search for base station 100-1-100-2. Input/output unit 208 comprises an output device such as a LCD (liquid crystal display device), LED (light emitting diode) or the like for displaying the contents processed by CPU 209, and an input device such as a power switch, keyboard and the like for the user to manipulate terminal 101-1. CPU 209 starts and controls the programs stored in storage unit 206. Bus 210 interconnects them. In this regard, signal intensity/communication quality measuring unit 203, base station search unit 204, and threshold setting unit 205 may be included in CPU 209, such that their respective processing is performed by programs within CPU 209. Also, the configuration of terminal 101-2 has a configuration similar to the configuration of terminal 101-1 shown in FIG. 3.

In the following, a description will be given of a base station search method using terminals 101-1-101-2 in the wireless LAN system shown in FIG. 2.

Figure 4:
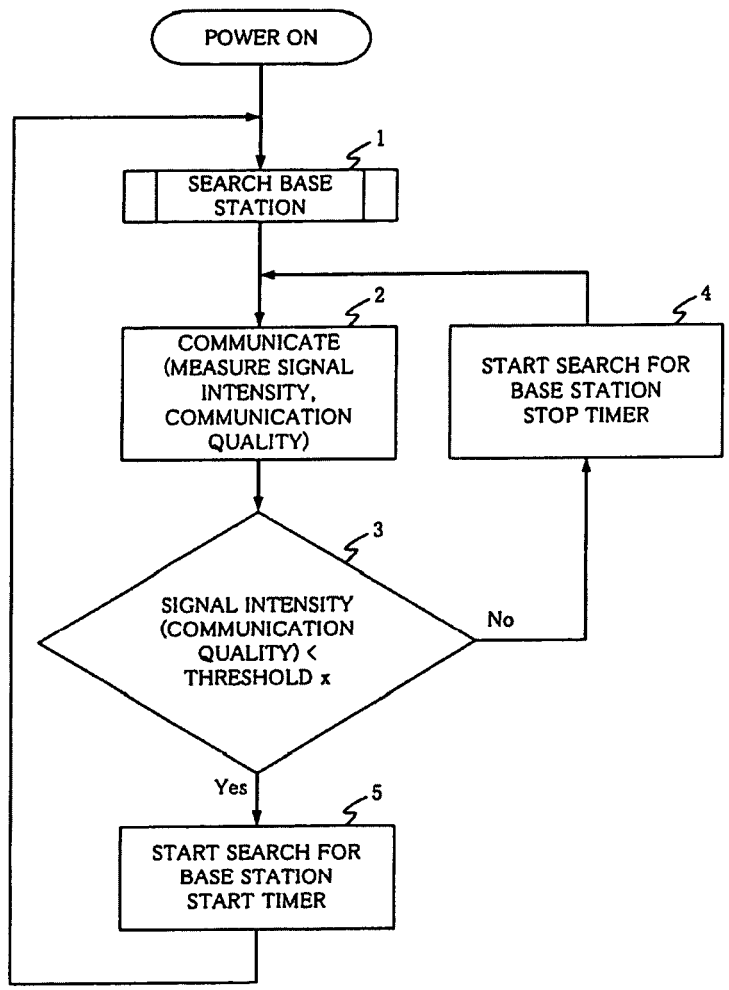
FIG. 4
A flow chart for describing a base station search method using the terminal in the wireless LAN system shown in FIG. 2.

FIG. 4 is a flow chart for describing the base station search method using terminals 101-1-101-2 in the wireless LAN system shown in FIG. 2.

First, as terminal 101-1-101-2 is powered on, it searches base station 100-1-100-2 with which it can communicate at step 1.

Figure 5:
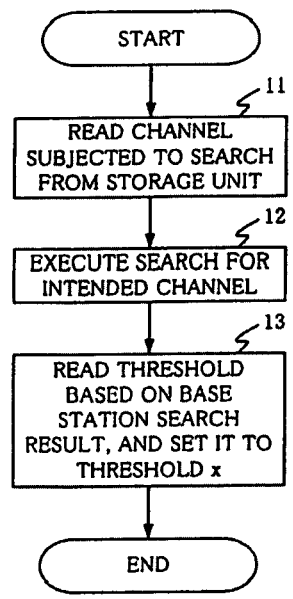
FIG. 5
A flow chart for describing processing of a subroutine at step 1 in the flow chart shown in FIG. 4.

FIG. 5 is a flow chart for describing processing of a subroutine at step 1 in the flow chart shown in FIG. 4.

The processing operation at step 1 shown in FIG. 4 involves step 11 in FIG. 5 at which CPU 209 first reads a channel subjected to a search from storage unit 206. Then, at step 12, base station search unit 204 executes a search for communicable base station 100-1-100-2 for the read channel. In this event, when terminal 101-1 exists, for example, at position (a) shown in FIG. 2, base station 100-1 is detected by the processing operation at step 120. On the other hand, when terminal 101-2 exists at position (c) shown in FIG. 2 at this time, base stations 100-1 and base station 100-2 are detected by the processing operation at step 12. In this regard, since the search processing operation at step 11 and step 12 is similar to conventional search processing, details on the processing are not described here.

Subsequently, based on the result of the search made by base station search unit 204 of terminal 101-1-101-2, a base station search trigger threshold value that corresponded to the number of detected base stations 100-1-100-2 is read from storage unit 206 by CPU 209. The read base station search trigger threshold is stored in storage unit 206 as threshold X by threshold setting unit 205 in correspondence to the unique identification number possessed by base station 100-1-100-2 at step 13.

Figure 6:
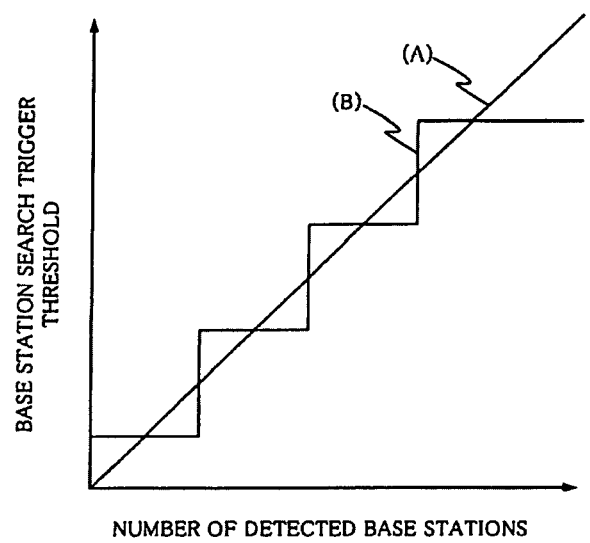
FIG. 6
A diagram showing a base station search trigger threshold for the number of detected base stations through a base station search at step 12 in the flow chart shown in FIG. 5.

FIG. 6 is a diagram showing the base station search trigger threshold with respect to the number of base stations detected through the base station search at step 12 in the flow chart shown in FIG. 5.

As shown in FIG. 6, the base station search trigger threshold changes in accordance with the number of base stations detected through the base station search. The number of detected base stations and base station search trigger thresholds may have linearly correspondence relationship as shown at (A), or may have correspondence relationship in steps as shown at (B).

FIG. 7 is a diagram showing an exemplary correspondence of the number of detected base stations to the base station search trigger threshold shown at (B) of FIG. 6. The correspondence shown in FIG. 7 has been previously stored in storage unit 206.

As shown in FIG. 7, when the number of detected base stations is 0 to 1, base station search trigger threshold "$\alpha$" corresponds to that number. Also, when the number of detected base stations is 2 to 3, base station search trigger threshold "$\beta$" corresponds to that number. Further, when the number of detected base stations is 4 to 5 base station search trigger threshold "$\gamma$" corresponds to that number. Further, when the number of detected base stations is 6 or more, base station search trigger threshold "$\delta$" corresponds to that number. While the base station search trigger threshold is represented by Greek letters for convenience of description, the base station search trigger threshold is actually a threshold for the intensity or communication quality of a signal transmitted from base station 100-1-100-2 and received at transmission/reception unit 202 and measured by signal intensity/communication quality measuring unit 203, and has been previously set by the system. Assume herein that "$\alpha$" corresponds to threshold 103-2 shown in FIG. 2, and "$\beta$" corresponds to threshold 103-1 shown in FIG. 2. Here, for terminal 101-1 since one base station 100-1 is detected at step 12, threshold X stored in storage unit 206 is threshold 103-2. On the other hand, for terminal 101-2, since two base stations 100-1-100-2 are detected at step 12, threshold X stored in storage unit 206 is threshold 103-1.

Then, as the processing operation of the subroutine shown in FIG. 5 terminates, a communication is made between terminal 101-1-101-2 and base station 100-1 at step 2. While communication is made between terminal 101-1-101-2 and base station 100-1, the intensity or communication quality of a received signal is measured by signal intensity/communication quality measuring unit 203.

Then, the measured signal intensity or communication quality is compared with threshold X stored in storage unit 206 by CPU 209 at step 3.

When it is determined that the signal intensity or communication quality is not a value smaller than threshold X, timer unit 207 stops at step 4, followed by the flow returning to the processing operation at step 2. In this event, when timer unit 207 is not operating, the flow returns to the processing operation at step 2 without any processing taking place.

On the other hand, when it is determined that the signal intensity or communication quality is a value smaller than threshold X, timer unit 207 starts at step 5. Subsequently, as the time previously set by timer unit 207 elapses, an interrupt is generated from timer unit 207 to CPU 209, causing the execution of the base station search processing at step 1.

For example, with terminal 101-1 existing at position (a) shown in FIG. 2, since threshold X is set to threshold 103-2, it is determined at step 3 in FIG. 4 that the signal intensity or communication quality is not a value smaller than threshold X, so that timer unit 207 does not start.

On the other hand, with terminal 101-2 existing at position (c) shown in FIG. 2, since threshold X is set to threshold 103-1, it is determined at step 3 in FIG. 4 that the signal intensity or communication quality is not a value smaller than threshold X, so that timer unit 207 does not start.

Figure 8:
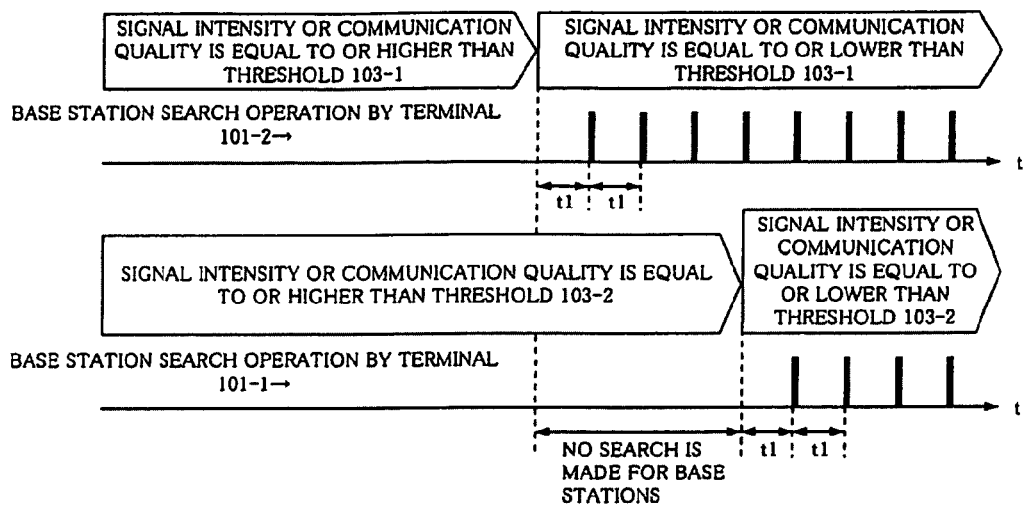
FIG. 8
A diagram showing a base station search timing at the terminal shown in FIG. 2 when the terminal moves from position (a) to (b), and further from (b) to (e), and when another terminal moves from position (c) to (d).

FIG. 8 is a diagram showing the base station search timing in terminals 101-1-101-2 when terminal 101-1 shown in FIG. 2 moves from position (a) to (b) and further from (b) to (e), and when terminal 101-2 moves from position (c) to (d).

When terminal 101-2 exists at position (c) with threshold X set to threshold 103-1, it is determined that the signal intensity or communication quality measured by signal intensity/communication quality measuring unit 203 is not a value smaller than threshold X, so that base station search unit 204 does not execute the base station search processing operation. Subsequently, as terminal 101-2 moves from position (c) to position (d), terminal 101-2 exists outside of threshold 103-1 shown in FIG. 2, so that it is determined that the signal intensity or communication quality measured by signal intensity/communication quality measuring unit 203 is a value smaller than threshold X. Thus, base station search unit 204 executes a base station search processing operation at period t1 which has been previously set in timer unit 207.

On the other hand, when terminal 101-1 exists at position (a) with threshold X set to threshold 103-2, it is determined that the signal intensity or communication quality measured by signal intensity/communication quality measuring unit 203 is not a value smaller than threshold X, so that base station search unit 204 does not execute a base station search processing operation. Subsequently, even if terminal 101-1 moves from position (a) to position (b), it is determined that the signal intensity or communication quality measured by signal intensity/communication quality measuring unit 203 is not a value smaller than threshold X. Accordingly, base station search unit 204 does not execute a base station search processing operation. Subsequently, as terminal 101-1 moves from position (b) to position (e), terminal 101-1 exists outside of threshold 103-2 shown in FIG. 2, so that it is determined that the signal intensity or communication quality measured by signal intensity/communication quality measuring unit 203 is a value smaller than threshold X. Thus, base station search unit 204 executes a base station search processing operation at period t1 which has been previously set in timer unit 207.

In this way, by changing the base station search start trigger threshold in accordance with the number of base stations 100-1-100-2 detected through the past base station search, it is possible to reduce useless execution of the base station search in terminals 101-1-101-2.

Alternatively, a method can also be contemplated to change threshold X in accordance with the changing amount of the signal intensity or communication quality measured by signal intensity/communication quality measuring unit 203.

Figure 9:
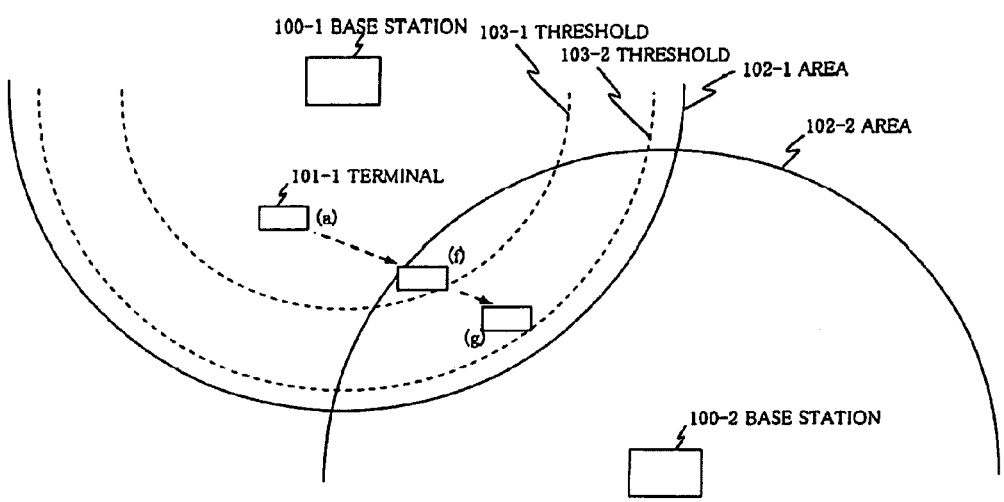
FIG. 9
A diagram showing another embodiment of a wireless LAN system of the present invention.

FIG. 9 is a diagram showing another embodiment of a wireless LAN system of the present invention.

As shown in FIG. 9, this embodiment comprises base stations 100-1-100-2 which are wireless LAN base stations, and terminal 101-1 which is a wireless LAN terminal. Also, communication areas covered by base stations 100-1-100-2 are areas 102-1-102-2, respectively. Assume herein that terminal 101-1 is communicating with base station 100-1. Also, base stations 100-1-100-2 have unique identification numbers for identifying each of them. Also, assume that a first base station search start trigger threshold for terminal 101-1 to search another base station in area 102-1 is threshold 103-1, and a second base station search start trigger threshold is threshold 103-2. These thresholds 103-1-103-2 schematically represent the first base station search start trigger threshold and second base station search start trigger threshold based on signal intensities or communication qualities of signals received at terminal 101-1. When the signal intensity or communication quality of a signal received at terminal 101-1 falls below the first or second base station search start trigger threshold i.e., when terminal 101-1 goes out of threshold 103-1-103-2 in FIG. 9, terminal 101-1 starts a search for another base station which is to become a switching candidate. Assume also that terminal 101-1 exists at position (a), and terminal 101-1 subsequently moves from position (a) to position (f), and further subsequently moves from position (f) to position (g). Also, terminal 101-1 is similar in configuration to that shown in FIG. 3.

In the following, a description will be given of a base station search method in the wireless LAN system shown in FIG. 9.

Figure 10:
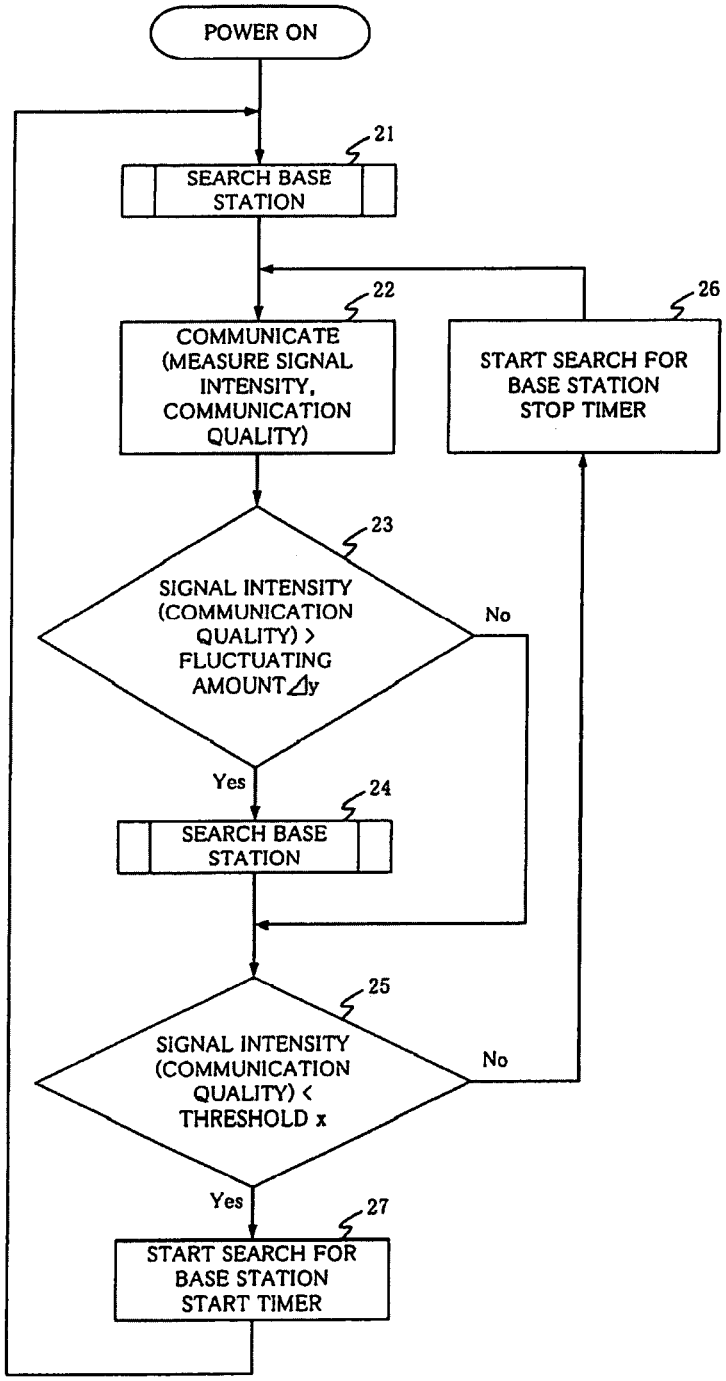
FIG. 10
A flow chart for describing a base station search method in the wireless LAN system shown in FIG. 9.

FIG. 10 is a flow chart for describing the base station search method in the wireless LAN system shown in FIG. 9.

First, as terminal 101-1 is powered on at position (a) shown in FIG. 9, it searches communicable base station 100-1-100-2 at step 21. This base station search processing operation is similar to the subroutine at step 1 shown in FIG. 4, i.e., the processing operation at steps 11-13 shown in FIG. 5.

Subsequently, communication is made between terminal 101-1 which exists at position (a) and base station 100-1 at step 22. While communication is being made between terminal 101-1 and base station 100-1, signal intensity/communication quality measuring unit 203 measures the intensity or communication quality of a received signal.

Then, a fluctuating amount which is the difference between the value of the measured signal intensity or communication quality and a previously measured value stored in storage unit 206 is compared with fluctuating amount $\Delta y$ previously stored in storage unit 206 by CPU 209 at step 23. Here, since no fluctuating amount exists for comparison with the value measured first after the power was turned, the flow goes to "No."

When it is determined that the fluctuating amount which is the difference between the value of the measured signal intensity or communication quality and the previously measured value stored in storage unit 206 is larger than fluctuating amount Δy previously stored in storage unit 206, a base station search processing operation is executed at step 24.

Figure 11:
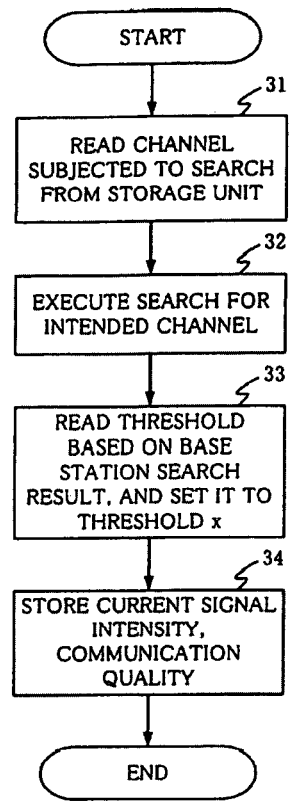
FIG. 11
A flow chart for describing processing of a subroutine at step 24 in the flow chart shown in FIG. 10.

FIG. 11 is a flow chart for describing processing of a subroutine at step 24 in the flow chart shown in FIG. 10.

The processing operation at step 24 shown in FIG. 10 involves step 31 in FIG. 11 at which CPU 209 first reads a channel subjected to a search from storage unit 206. Then, at step 32, base station search unit 204 executes a search for communicable base station 100-1-100-2 to locate for the read channel. In this event, when terminal 101-1 exists, for example, at position (a) shown in FIG. 2, base station 100-1 is detected by the processing operation at step 32. In this regard, since the search processing operation at step 31 and step 32 is similar to conventional search processing, details on the processing are not described here.

Subsequently, based on the result of the search made by base station search unit 204 of terminal 101-1a base station search trigger threshold value that corresponded to the number of detected base stations 100-1-100-2 is read from storage unit 206 by CPU 209. The read base station search trigger threshold is stored in storage unit 206 as threshold X by threshold setting unit 205 in correspondence to the unique identification number possessed by base station 100-1-100-2 at step 33. The correspondence of the number of detected base stations 100-1-100-2 to the base station search trigger threshold may be, for example, similar to that shown in FIG. 7.

Then, the value of the signal intensity or communication quality measured at step 21 is stored in storage unit 206 by CPU 209 at step 34.

When "No" is selected at step 23, or when the processing of the subroutine at step 24 terminates, the measured signal intensity or communication quality is compared with threshold X stored in storage unit 206 by CPU 209 at step 25.

When it is determined that the signal intensity or communication quality is not a value smaller than threshold X, timer unit 207 stops at step 26, and the flow returns to the processing operation at step 22. In this event, when timer unit 207 is not operating, the flow returns to the processing operation at step 22 without any processing being performed.

On the other hand, when it is determined that the signal intensity or communication quality is a value smaller than threshold X, timer unit 207 starts at step 27. Subsequently, as the time previously set by timer unit 207 elapses, an interrupt is generated from timer unit 207 to CPU 209, causing the execution of the base station search processing at step 21.

This embodiment will be further described giving another specific example.

Assume, for example, that a threshold, at which terminal 101-1 existing at position (a) shown in FIG. 9 starts a base station search, is set to threshold 103-2. Subsequently, as terminal 101-1 moves from position (a) to position (f), no search is made for base station 100-2 which is to become a switching candidate because the signal intensity or communication quality measured by signal intensity/communication quality measuring unit 203 of terminal 100-1 does not fall below threshold 103-2 although terminal 101-1 exists at a position at which base station 100-2 can be detected. Thus, new threshold 103-1 is set when the difference between the signal intensity or communication quality measured by signal intensity/communication quality measuring unit 203 and the previously measured signal intensity or communication quality is larger than a previously set changing amount. Specifically, when it is determined that a signal of lower intensity is transmitted from base station 100-1 with which terminal 101-1 is currently communicating, or that the communication quality becomes exacerbated, the threshold for searching another base station is changed to a value higher than the current threshold. Subsequently, as terminal 101-1 moves to position (g), a base station search processing operation is executed because the signal intensity or communication quality measured by signal intensity/communication quality measuring unit 203 falls below threshold 103-1.

Figure 12:
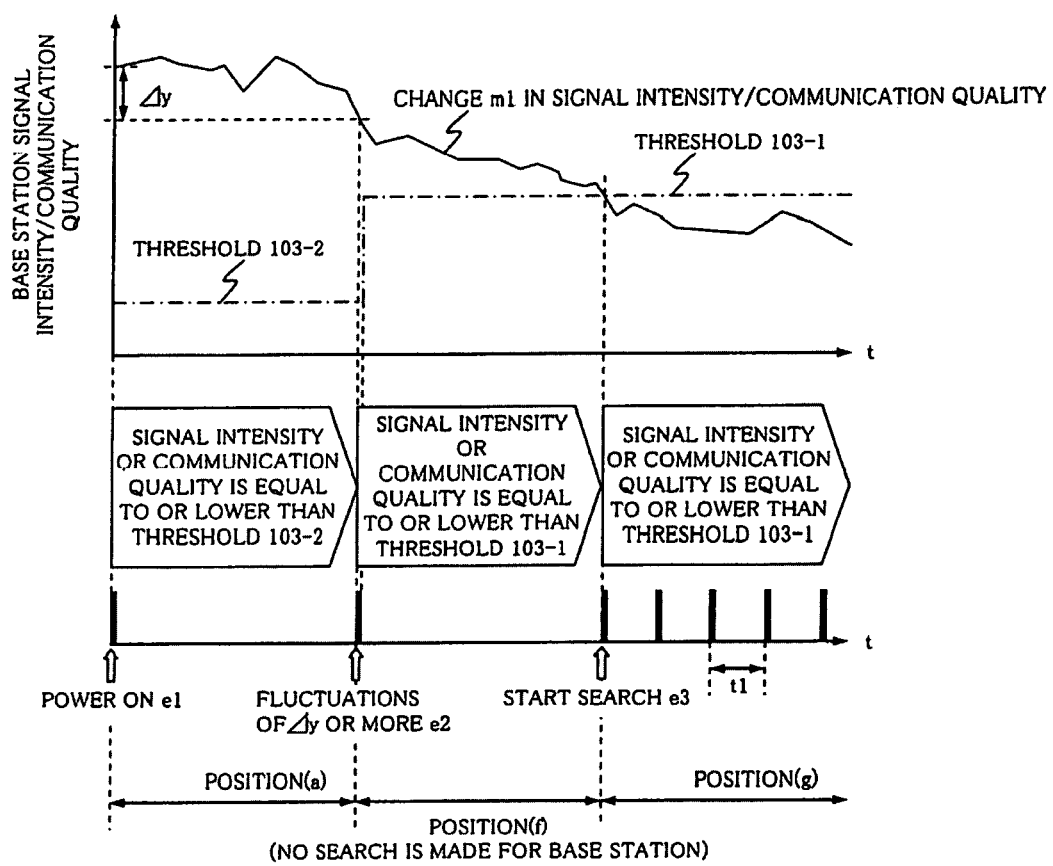
FIG. 12
A diagram showing a base station search timing in the terminal shown in FIG. 9 when the terminal moves from position (a) to position (f) and further from position (f) to position (g).

FIG. 12 is a diagram showing a base station search timing in terminal 101-1 when terminal 101-1 moves from position (a) to position (f) and further from position (f) to position (g) shown in FIG. 9. In FIG. 12, the signal intensity or communication quality measured by signal intensity/communication quality measuring unit 203 is designated as change m1.

When terminal 101-1 exists at position (a) with threshold X set to threshold 103-2, it is determined that the signal intensity or communication quality measured by signal intensity/communication quality measuring unit 203 is not a value smaller than threshold X. Accordingly, base station search unit 204 does not execute the base station search processing. Subsequently, as terminal 101-1 moves from position (a) to position (f), the difference between the signal intensity or communication quality measured by signal intensity/communication quality measuring unit 203 and the previously measured signal intensity or communication quality becomes larger than previously set fluctuating amount Δy. Thus, base station search unit 204 executes the base station search processing. Then, threshold X is changed from threshold 103-2 to threshold 103-1. Further, as terminal 101-1 moves from position (f) to position (g), it is determined that the signal intensity or communication quality measured by signal intensity/communication quality measuring unit 203 is smaller than threshold value 103-1 which is set to threshold X. Thus, base station search unit 204 executes the base station search processing at period t1 which has been previously set in timer unit 207.

While the foregoing description has been given using two thresholds, i.e., threshold 103-1 and threshold 103-2 as an example, the thresholds may be actually changed in accordance with a systems design. For example, two or more thresholds, i.e., three or four may be provided, or hysteresis may be defined in order to prevent a terminal located near a threshold from frequently going across the threshold to and fro.

The invention claimed is:

1. A wireless LAN system comprising:
   a wireless LAN terminal; and
   a wireless LAN base station with which the wireless LAN terminal is currently connected,
   wherein the wireless LAN terminal:
      determines that an intensity or communication quality of a signal transmitted from said wireless LAN base station and received at said wireless LAN terminal falls below a threshold;
      in response to determining that the intensity or communication quality of the signal has fallen below the threshold, searches for and locating a number of wireless LAN base stations with which said wireless LAN terminal is able to communicate, the number of wireless LAN base stations including said wireless LAN base station;
      changes the threshold in accordance with the number of wireless LAN base stations that have been located, wherein the number of wireless LAN base stations are switching candidates to which to switch connection by said wireless LAN terminal from said wireless LAN base station.

2. A wireless LAN terminal comprising:
a wireless transceiver by which the wireless LAN terminal is currently connected with a wireless LAN base station; and
logic implemented at least in hardware to:
 determine that an intensity or communication quality of a signal transmitted from said wireless LAN base station and received at said wireless LAN terminal falls below a threshold;
 in response to determining that the intensity or communication quality of the signal has fallen below the threshold, search for and locate a number of wireless LAN base stations with which said wireless LAN terminal is able to communication, the number of wireless LAN base stations including said wireless LAN base station;
 change the threshold in accordance with the number of wireless LAN base stations that have been located,
wherein the number of wireless LAN base stations are switching candidates to which to switch connection by said wireless LAN terminal from said wireless LAN base station.

3. A method comprising:
connecting by a wireless LAN terminal to a wireless LAN base station;
determining by the wireless LAN terminal that an intensity or communication quality of a signal transmitted from the wireless LAN base station and received at the wireless LAN terminal is less than a threshold;
in response to determining that the intensity or communication quality of the signal is less than the threshold, searching for and locating a number of wireless LAN base stations with which the wireless LAN base station is able to communicate, the number of wireless LAN base stations including the wireless LAN base station;
changing the threshold in accordance with the number of wireless LAN base stations that have been located,
wherein the number of wireless LAN base stations are switching candidates to which to switch connection by the wireless LAN terminal from the wireless LAN base station.

4. The method of claim 3, wherein the threshold is changed linearly with the number of wireless LAN base stations that have been located.

5. The method of claim 3, wherein the threshold is changed in a stair-step manner with the number of wireless LAN base stations that have been located.

6. The method of claim 3, further comprising:
selecting, by the wireless LAN terminal, a new wireless LAN base station to which to connect, from the number of wireless LAN base stations other than the wireless LAN base station to which the wireless LAN terminal is currently connected;
disconnecting, by the wireless LAN terminal, from the wireless LAN base station to which the wireless LAN terminal is currently connected; and
connecting, by the wireless LAN terminal, to the new wireless LAN base station that has been selected.

* * * * *